[redacted]

[11] 3,588,336

[72] Inventor Harry Scher
Brooklyn, N.Y.
[21] Appl. No. 756,650
[22] Filed Aug. 30, 1968
[45] Patented June 28, 1971
[73] Assignee Wells Television, Inc.
New York, N.Y.

[54] HOSPITAL COMMUNICATION SYSTEM

4 Claims, 4 Drawing Figs.

[52] U.S. Cl. 178/6.8, 174/115, 178/5.6
[51] Int. Cl. H01b 7/00, H01b 11/00, H04n 7/18
[50] Field of Search 178/6 (Ind), 6 (PD), 6.8, 5.6, 7.81, 7.9

[56] References Cited

UNITED STATES PATENTS

| | | | |
|---|---|---|---|
| 3,072,738 | 1/1963 | Epps | 178/7.9 |
| 3,105,873 | 10/1963 | Winston | 178/6PD |
| 3,328,510 | 6/1967 | White | 178/6PD |
| 3,345,461 | 10/1967 | Bunting | 178/7.81 |
| 3,423,521 | 1/1969 | Friesen | 178/5.6 |

OTHER REFERENCES

RADIO ELECTRONICS - Feb. 1955 Hugo Gernsbeck - " The Teledoctor" pp 54— 55. Copy in 178 6 IND

*Primary Examiner*—James W. Moffitt
*Assistant Examiner*—Howard W. Britton
*Attorney*—Robert G. McMorrow

ABSTRACT: An improved hospital communication system including a composite cable for carrying television signals between television equipment located at a nurse's station and in a patient's room. The composite cable also carries low voltage direct current for operating the television equipment in the patient's room. The composite cable includes a coaxial cable for carrying the television signals and insulated conductors extending along the coaxial cable for carrying the DC operating power. A covering is wrapped around the coaxial cable and conductors to form the composite cable. In one embodiment of the system, a television receiver in the patient's room is selectively connected to a television camera at the nurse's station so that the nurse's image is displayed on the patient's receiver. In another embodiment, a surveillance T.V. camera is added to the system in the patient's room for transmitting an image of the patient to a surveillance monitoring receiver located at the nurse's station. The same composite cable transmits television signals between the surveillance camera and surveillance receiver simultaneously with the transmission of television signals from the nurse's camera to the patient's television receiver. The same cable also supplies low voltage DC for operating the surveillance camera. In both embodiments, the hospital's master T.V. antenna is normally coupled through the composite cable to the patient's television receiver so that the patient normally enjoys broadcast television programs picked up by the antenna.

INVENTOR
HARRY SCHER

BY Robert G. McMorrow
ATTORNEY

INVENTOR
HARRY SCHER

BY Robert G. McMorrow
ATTORNEY

HOSPITAL COMMUNICATION SYSTEM

BACKGROUND OF THE INVENTION

Field of the Invention

The invention relates generally to hospital communication systems and, more particularly, to an improved hospital communication system employing a single composite cable for carrying both television signals and low voltage DC power for operating television equipment used in the system.

Description of the Prior Art

Hospital communication systems of the prior art have used a single-conductor coaxial cable to carry both the television signals and the power for operating a television receiver in the patient's room. Furthermore, the nurse call signals were also carried over the same single-conductor coaxial cable. The disadvantage of such prior art systems is that, if a short circuit or other fault should occur on the single-conductor coaxial cable, not only would the television signals be lost, but the all-important nurse call circuit would also be interrupted. Furthermore, in such prior art systems, if it were desired to operate from the cable a surveillance T.V. camera to permit continuous visual monitoring of the patient at the nurse's station, then the patient's television receiver would have to be replaced by the camera. In other words, both the patient's television receiver and the surveillance camera could not be operated simultaneously.

SUMMARY OF THE INVENTION

The object of this invention is to provide an improved hospital communication system which eliminates the defects of the prior art systems and is fully compatible with existing nurse call systems. This object is accomplished by providing a single composite cable including a single-conductor coaxial cable plus a plurality of individual conductors extending along the exterior of the coaxial cable. The coaxial cable carries all the television signals between the nurse's station and the patient's room, and the individual conductors carry low voltage direct current power for operating all the television apparatus in the patient's room. Therefore, it can be seen that a hospital communication system embodying the composite cable of this invention does not suffer from the disadvantages found in the prior art. More specifically, if a fault should occur on the coaxial cable, the nurse call circuit and other circuits powered by the low voltage direct current carried by the individual conductors will not be lost. Furthermore, the use of several individual conductors permits both a television receiver and a surveillance camera to be operated simultaneously in the patient's room.

DETAILED DESCRIPTION OF THE INVENTION

Figures 1, 4:
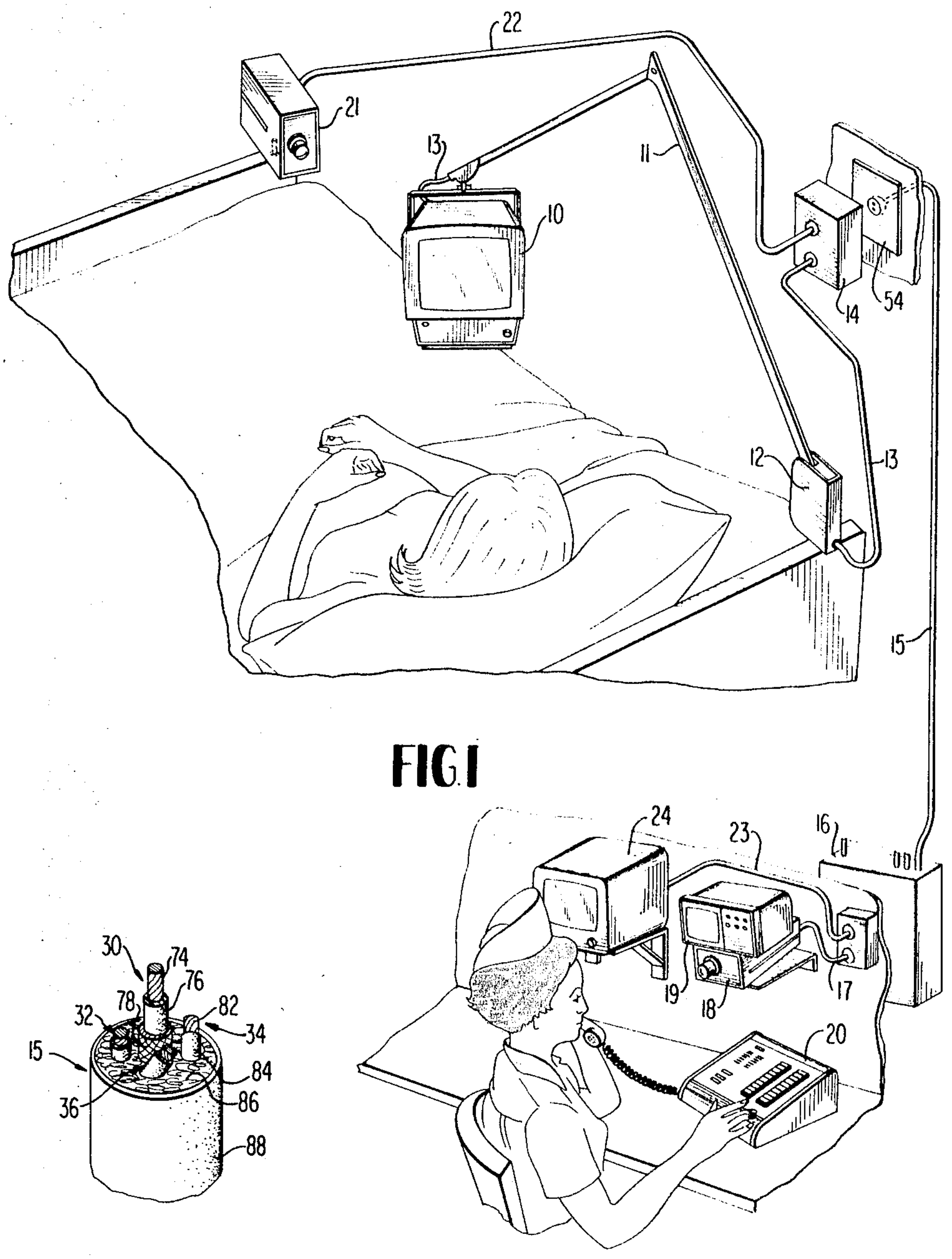
FIG. 1 is a pictorial diagram of an improved hospital communication system embodying the invention.
FIG. 4 is a cutaway perspective view of the composite cable forming a part of the improved hospital communication system illustrated in FIG. 2.

FIG. 1 is a pictorial view of the type of an improved hospital communication system embodying the invention. A small screen transistorized television set 10 is supported in front of the patient's head by means of an adjustable support arm assembly 11 which is mounted on the head of the bed by a clamp 12. The television set is connected via a composite cable 13, an adapter box 14, a wall outlet plate 54, a composite cable 15, a distribution panel 16, and a coaxial cable 17 to a television camera 18 mounted at the nurse's station. A monitoring receiver 19 is mounted on top of camera 18 to permit the nurse to see her image as it appears on the patient's receiver 10. An intercom master station and selector 20 is also available to the nurse for voice communication with individual patients. A patient surveillance T.V. camera 21 may be mounted on the foot of the patient's bed and is connected via a composite cable 22, adapter box 14, wall outlet plate 54, composite cable 15, distribution panel 16, and a coaxial cable 23 to a surveillance monitoring receiver 24 mounted at the nurse's station.

The structure of the composite cables will be described later in more detail; however, composite cable 15 functions simultaneously to carry television signals between the nurse's station and the patient's room, and also to carry low voltage (12 volts) direct current power to operate the television receiver 10 and T.V. surveillance camera 21 located in the patient's room. Each television receiver 10 used in such a system has been modified to operate on low voltage DC power rather than on 120 volt, 60 cycle AC power, thereby eliminating the need for a separate power cord for each set. However, the camera 18 and receivers 19 and 24 at the nurse's station are operated from the hospital's AC power supply. As described in more detail below, the television signals fed via the composite cable to the patient's receiver 10 are normally the r.f. signals derived from the hospital's master T.V. antenna and applied to the tuner input of the receiver. However, when the nurse's camera is connected to the patient's receiver, the antenna is automatically disconnected, and the video signals from the camera are converted to the intermediate frequency range of the receiver and fed directly to the I.F. section of the receiver. Furthermore, the cable 15 may also carry the nurse call signals which permit a patient to signal the nurse's station for attention. However, the nurse call and intercom functions may be provided by circuits separate from cable 15, if desired.

In operation, the patient's television receiver 10 is also connected via cable 15 and distribution panel 16 to the hospital's master antenna so that the patient can normally receive on his television set any television programs picked up by the antenna. However, when the nurse actuates her intercom master station and selector 20 to close the patient's intercom circuit in response to a signal received from the patient over a nurse call circuit, automatic switching circuits operate to disconnect the patient's television set 10 from the master antenna and to connect the nurse's television camera 18 in a closed circuit to the patient's television set. Therefore, as the nurse and patient talk over the intercom circuit, the patient sees the nurse's face displayed on the television set 10. The nurse's monitor receiver 19 displays the same picture which is displayed on the patient's television set 10.

In a variation of this improved hospital communication system, the surveillance television camera 21 is added to the system and may be mounted at the foot of the patient's bed to transmit an image of the patient to the nurses' surveillance monitoring receiver 24. Such a variation is useful in high intensity care cases where the nurse desires continuously to visually monitor the patient. During this visual monitoring, the patient's television set 10 may be receiving images from either the master antenna or the nurse's camera 18.

Figures 2, 3:
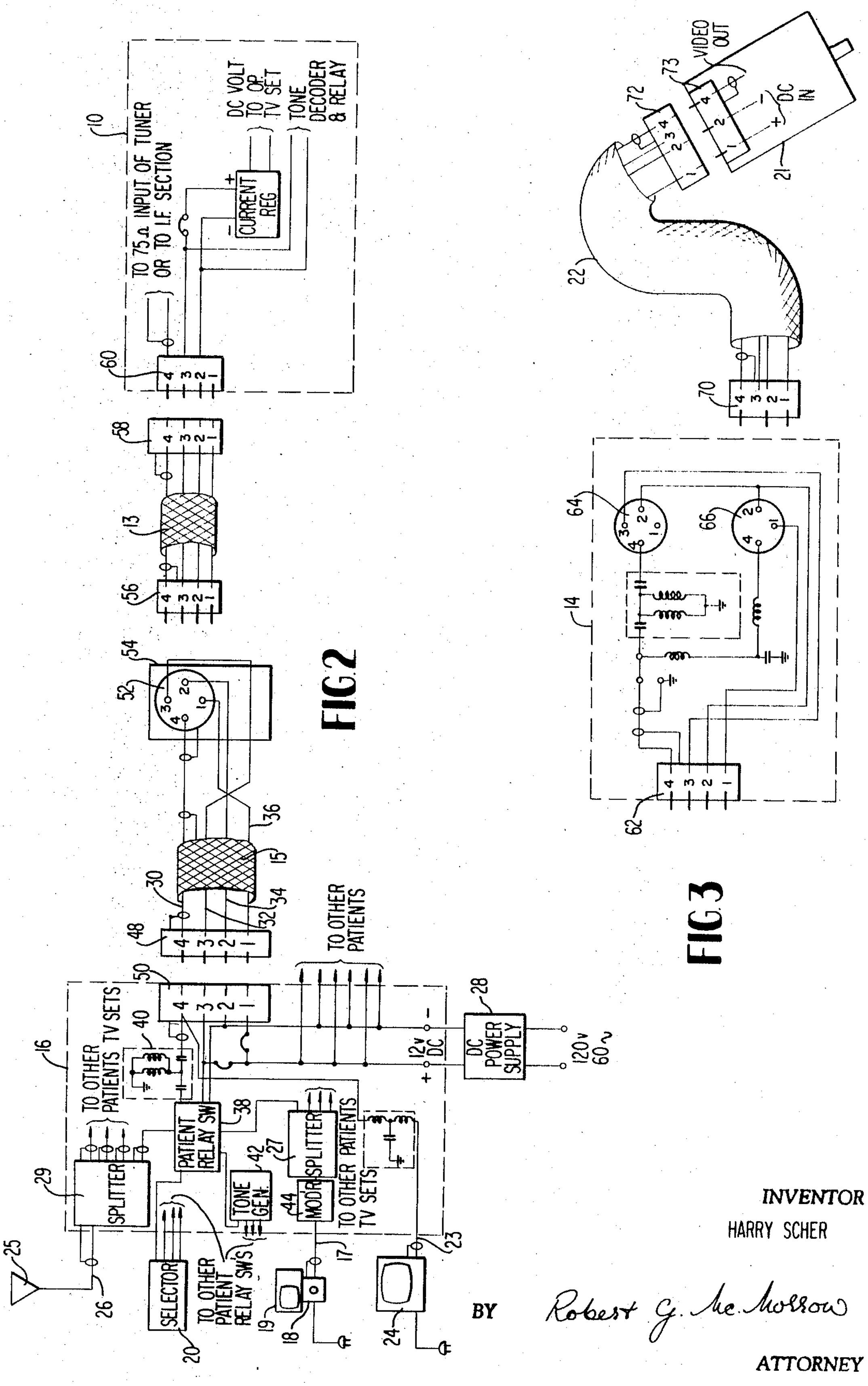
FIG. 2 is a schematic diagram of one embodiment of the improved hospital communication system including the novel composite cable of this invention.
FIG. 3 is a schematic diagram illustrating the manner in which the embodiment of FIG. 2 may be modified to form a second embodiment of the invention.

FIG. 2 illustrates schematically the composite cables and the manner in which they are used in one embodiment of the improved hospital communication system.

Block 16 identifies a distribution panel which contains the automatic switching circuits, power splitters, coupling units, tone generator for a nurse call system, etc. necessary for the operation of the hospital communication system. All of these components are conventional and per se are not the subject of this invention.

The hospital master television antenna 25 is coupled to the distribution panel 16 by a coaxial cable 26. All of the coaxial cables used in the system consist of a central conductor centrally spaced within a grounded shield by means of suitable insulating material.

Also coupled by coaxial cable 17 to the distribution panel 16 is the nurses' television camera 18. A DC power supply unit 28 is also connected to panel 16 and contains the necessary transformers and rectifiers for converting the 120 volt, 60 cycle hospital power to 12 volt DC for operating the patients' television receivers, and patients' T.V. surveillance cameras, if any.

Even though a composite cable 15 is shown in detail for coupling only one patient's television set to the distribution panel, splitters 27 and 29 and multiple output terminals on power supply 28 permit other composite cables to be coupled between the panel and other respective individual television sets. The functions and structure of only cable 15 will be described in detail; however, it is to be understood that the functions and structures of all the composite cables used in the system are the same.

Let us now look at the manner in which cable 15 functions to carry television signals and power to the patient's television set 10. The composite cable is illustrated as consisting of a coaxial cable 30 for carrying television signals, a pair of insulated conductors 32 and 34 for carrying low voltage direct current power for operating the television set 10, and a third insulated conductor 36 which may be used for supplying power to a patient surveillance camera, physiological monitoring apparatus, nurse call system, etc. Of course, additional conductors may be incorporated in composite cable 15 to provide additional circuits as required.

When the patient is viewing a standard television program, the television signals are received by antenna 25 and fed through coaxial cable 26, splitter 29, a patient relay switch 38, and a filter network 40 to the coaxial cable 30 which is ultimately connected to the patient's television set 10. Conductors 32 and 34 carry 12 volt DC power to television set 10 to provide the operating power for the set.

The corresponding electrical parts in the various cables and connectors have been labeled with the same reference numeral for ease of identification. Thus, 4 identifies the central conductor of coaxial cable 30; 3, a positive conductor for the DC power; 2, the negative or ground conductor for the DC power; and 1, another positive conductor for the DC power.

Only conductors 32 and 34 are required for powering television set 10. The conductor 36 may carry power for operating a surveillance camera, if used, or any other equipment, such as physiological monitoring apparatus.

When the nurse operates her intercom master station and selector 20 to communicate with the patient, relay switch 38 is operated to disconnect antenna 25 from cable 30 and to connect the television camera 18 to cable 30. When relay switch 38 is operated, a tone generator 42 is also connected thereby across conductors 32 and 34. The tone generator signal operates a relay (not shown) in the television set 10 to bypass the on-off control of the set and automatically connect the set to the low voltage DC power on conductors 32 and 34.

The nurse's camera 18, as well as monitor 19, are powered by the standard hospital AC power, such as 120 volts, 60 cycle current. The video output from camera 18 is converted by a modulator 44 to the intermediate frequency range of the television receiver 10. The I.F. output from modulator 44 is then fed through splitter 27, relay switch 38 and conductor 4 of coaxial cable 30 to the I.F. section of the television set 10. The signal from the generator 42 not only bypasses the power switch of television set 10 but also operates a relay to switch the signals on conductor 4 to the I.F. section of the television set. When patient relay switch 38 is not operated to connect the tone generator to cable 15, i.e., when the master antenna 25 is coupled to the television set 10, then the r.f. signals on conductor 4 are applied to the 75 ohm tuner input of the set 10 rather than to the I.F. section thereof.

The structure of the composite cables is shown schematically in FIG. 2. A male connector 48 on one end of cable 15 cooperates with a female connector 50 on panel 16 in order to couple the television signals and DC power to the appropriate conductors in cable 15. The other end of cable 15 is connected to another female connector 52 mounted in a wall outlet plate 54 in the patient's room. The composite cable 13 extends between the wall plate 54 and the television set 10. Cable 13 is identical in structure to cable 15. A male connector 56 on one end of cable 13 cooperates with the female connector 52, and a female connector 58 on the other end of cable 13 cooperates with a male connector 60 in the patient's television set 10.

Conductor 4 of cable 13 is connected through a relay (not shown) to either the 75 ohm tuner input or the I.F. section of television set 10. If the master antenna is connected to the set, then conductor 4 is connected to the tuner input. If the nurse's camera 18 is coupled to the set, then the tone generator 42 operates the relay to switch conductor 4 to the I.F. section of the set. Conductors 32 and 34 are connected through a current regulator 52 to the power circuits of the television set. Conductor 36 is not used in the embodiment illustrated in FIG. 2, but it may be used for supplying power to a surveillance camera, a nurse call system, physiological monitoring apparatus, etc.

FIG. 3 illustrates a variation of the system of FIG. 2 whereby, a patient surveillance camera may be added to the system and operated simultaneously with the patient's television set 10. In this case, composite cable 15 transmits video signals from the camera to a surveillance monitoring receiver 24 at the nurse's station. Conductor 36 of cable 15 also provides the low voltage DC power for operating the surveillance camera with conductor 34 acting as a return or ground. The monitoring receiver 24 is AC powered.

FIG. 3 illustrates the circuits contained within the adapter box 14 shown in FIG. 1. When a surveillance camera is to be used simultaneously with the television set 10, male connector 56 on cable 13 is unplugged from connector 52 in wall plate 54, and the male connector 62 of adapter box is plugged into connector 52. The adapter box has two female receptacles 64 and 66. Connector 56 is then plugged into receptacle 64 so that television set 10 is connected via cables 13 and 15 to the distribution panel 16. A composite cable 22 is used to connect the surveillance camera 21 through adapter box 14 to cable 15. Male connector 70 is plugged into receptacle 66, and a female connector 72 is plugged into a male connector 73 on surveillance camera 21.

As seen from the wiring connections in FIG. 3, the video signals from camera 21 are fed over path 4 which corresponds to the central conductor of the coaxial cable of the composite cable. The networks of capacitors and inductors permit the video signals from camera 21 and the R.F. signal from master antenna 25 to be combined and simultaneously fed along the coaxial cable 30, i.e., path 4. Paths 3 and 2 supply the low voltage DC power through adapter box 14 to operate television set 10, and paths 1 and 2 supply the DC power to operate the surveillance camera 21.

FIG. 4 illustrates the construction of the composite cables 13 and 15. The coaxial cable 30, for example, consists of a conductor 74 spaced by insulating material 76 centrally within a metal shield 78. Conductors 32, 34 and 36 extend along the cable and lie against the shield 78. Each conductor consists of a wire 82 surrounded by insulation 84. A cotton filler 86 occupies the spaces between the conductors 32, 34 and 36. A protective covering 88 completes the composite cable. The cotton filler keeps the conductors 32, 34 and 36 from moving and also provides a smooth, round surface for the composite cable.

There has been described above an improved hospital communication system which eliminates the disadvantages of the prior art. With this improved system, even though television signals and low voltage DC power are transmitted over the same composite cable, a fault on the television circuit of the cable will not affect the DC power circuits for operating a nurse call system, physiological monitoring apparatus, etc. Furthermore, in this improved system a single composite cable simultaneously carries television signals to a patient's television set and also from a patient surveillance camera while also carrying low voltage DC power for operating both the set and camera.

While the invention has been particularly shown and described with reference to preferred embodiments thereof, it will be understood by those skilled in the art that various changes in form and details may be made therein without departing from the spirit and scope of the invention.

I claim:

1. A hospital communication system comprising:

a. a source of low voltage DC power;

b. a first television means comprising a patient's receiver located at a patient's bed and a nurse's camera located at a nurse's station, whereby an image of a nurse is displayed on said patient's receiver;

c. a second television means comprising a nurse's receiver located at said nurse's station and a surveillance camera located at a patient's bed, whereby an image of a patient is displayed on said nurse's receiver;

d. a composite cable including:

1. a coaxial cable for carrying television signals from said nurse's camera to said patient's receiver and from said surveillance camera to said nurse's receiver,
2. first conductor means extending along said coaxial cable for carrying said low voltage DC power from said source to said patient's receiver for operating said patient's receiver,
3. second conductor means extending along said coaxial cable for carrying low voltage DC power from said source to said surveillance camera for operating said surveillance camera,
4. means enclosing said coaxial cable and said first and second conductor means to form a composite cable, e. coupling means for coupling said coaxial cable between said first and second television means, said coupling means including adapter means interconnecting said patient's receiver and said surveillance camera, whereby said patient's receiver and said surveillance camera may operate simultaneously and said coaxial cable simultaneously carries television signals from said nurse's camera to said patient's receiver and from said surveillance camera to said nurse's receiver.

2. The system of claim 1 further comprising:

a. a master television antenna connected to said patient's receiver;

b. an intercom for communication between the patient and the nurse's station; and c. relay switch means operated by activation of said intercom disconnecting said master antenna from said receiver and for connecting said nurse's camera to said patient's camera.

3. A hospital communication system as defined in claim 1 further comprising a plurality of patients' television receivers each coupled to said nurse's television camera by individual composite cables.

4. A hospital communication system as defined in claim 3 further comprising a plurality of surveillance cameras in different patients' rooms and a plurality of surveillance receivers at said nurse's station, corresponding cameras and receivers being interconnected via corresponding ones of said individual composite cables.